US009860306B2

(12) United States Patent
Threlkeld et al.

(10) Patent No.: US 9,860,306 B2
(45) Date of Patent: Jan. 2, 2018

(54) COMPONENT-SPECIFIC APPLICATION PRESENTATION HISTORIES

(71) Applicant: Microsoft Corporation, Redmond, WA (US)

(72) Inventors: Elizabeth Fay Threlkeld, Redmond, WA (US); William Scott Stauber, Seattle, WA (US); Petteri Mikkola, Bellevue, WA (US); Keri Kruse Moran, Bellevue, WA (US); Issa Y. Khoury, Redmond, WA (US); Ryan Chandler Pendlay, Bellevue, WA (US); Kenton Allen Shipley, Woodinville, WA (US); David John Woods, Bellevue, WA (US); Ramrajprabu Balasubramanian, Renton, WA (US); Darren Ray Davis, Woodinville, WA (US); Patrick Derks, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 564 days.

(21) Appl. No.: 14/495,181

(22) Filed: Sep. 24, 2014

(65) Prior Publication Data

US 2016/0085416 A1     Mar. 24, 2016

(51) Int. Cl.
*G06F 3/0484*     (2013.01)
*H04L 29/08*     (2006.01)
*G06F 9/44*     (2006.01)

(52) U.S. Cl.
CPC ............ *H04L 67/10* (2013.01); *G06F 9/4443* (2013.01); *H04L 67/02* (2013.01)

(58) Field of Classification Search
CPC ... G06F 3/04842; G06F 3/0481; H04L 67/02; H04L 67/10
See application file for complete search history.

(56) References Cited

U.S. PATENT DOCUMENTS 6,748,195 B1    6/2004   Phillips
6,941,356 B2    9/2005   Meyerson
(Continued)

FOREIGN PATENT DOCUMENTS

EP         2701044 A1    2/2014
WO    2009143294 A1   11/2009
(Continued)

OTHER PUBLICATIONS

Martin, BR., "Separate Back Stack for each tab in Android using Fragments", Published on: May 18, 2013, pp. 15, Available at: http://stackoverflow.com/questions/6987334/separate-back-stack-for-each-tab-in-android-using-fragments.
(Continued)

*Primary Examiner* — Anil Bhargava
(74) *Attorney, Agent, or Firm* — Cooper Legal Group, LLC

(57) ABSTRACT

In many computing scenarios, a computing environment of a device may present applications through various presentation components, such as displays, speakers, and headphones. However, navigating among the applications currently presented within the computing environment may be difficult for the user; e.g., for a device presenting many applications on many displays that share an application stack, the application that the user wishes to select may be buried deep within the shared application stack. In accordance with the techniques presented herein, the device may generate an application presentation history for each presentation component, indicating applications that have previously been presented through the presentation component. A request to transition a selected presentation component away from a current application presentation may be fulfilled by identifying a second application having an application presentation in the application presentation history of
(Continued)

the selected presentation component, and transitioning the selected presentation component to the second application.

20 Claims, 9 Drawing Sheets

(56) References Cited

U.S. PATENT DOCUMENTS

| | | | |
|---|---|---|---|
| 7,437,183 | B2 | 10/2008 | Makinen |
| 7,523,226 | B2 | 4/2009 | Anderson et al. |
| 7,574,469 | B2 | 8/2009 | Lorencz |
| 7,716,273 | B2 | 5/2010 | Soin et al. |
| 7,840,509 | B1 | 11/2010 | Messina |
| 7,937,075 | B2 | 5/2011 | Zellner |
| 8,041,296 | B2 | 10/2011 | Skog et al. |
| 8,150,945 | B2 | 4/2012 | Karaoguz et al. |
| 8,504,936 | B2 | 8/2013 | Gimpl et al. |
| 8,711,552 | B2 | 4/2014 | Medica et al. |
| 2003/0055738 | A1 | 3/2003 | Alie |
| 2003/0189597 | A1 | 10/2003 | Anderson et al. |
| 2003/0214458 | A1 | 11/2003 | Giemborek et al. |
| 2006/0203758 | A1 | 9/2006 | Tee et al. |
| 2006/0236255 | A1* | 10/2006 | Lindsay ............... G06F 3/0481 715/766 |
| 2007/0299796 | A1 | 12/2007 | Macbeth et al. |
| 2008/0005693 | A1* | 1/2008 | Oliver ................. G06F 9/4443 715/781 |
| 2008/0248834 | A1 | 10/2008 | Chaterjee et al. |
| 2010/0064228 | A1 | 3/2010 | Tsern |
| 2011/0066971 | A1 | 3/2011 | Forutanpour et al. |
| 2011/0126119 | A1* | 5/2011 | Young ............... G06F 17/30905 715/744 |
| 2011/0130178 | A1 | 6/2011 | Shin et al. |
| 2011/0214162 | A1 | 9/2011 | Brakensiek et al. |
| 2011/0221765 | A1 | 9/2011 | Nason et al. |
| 2011/0230178 | A1 | 9/2011 | Jones et al. |
| 2011/0246891 | A1 | 10/2011 | Schubert et al. |
| 2011/0246904 | A1 | 10/2011 | Pinto et al. |
| 2011/0307841 | A1 | 12/2011 | Boldyrev et al. |
| 2012/0017147 | A1 | 1/2012 | Mark |
| 2012/0050183 | A1 | 3/2012 | Lee |
| 2012/0054648 | A1* | 3/2012 | Morris ................. G06F 3/0481 715/764 |
| 2012/0176396 | A1 | 7/2012 | Harper et al. |
| 2012/0210266 | A1* | 8/2012 | Jiang .................... H04N 21/233 715/772 |
| 2012/0266079 | A1 | 10/2012 | Lee et al. |
| 2012/0282914 | A1 | 11/2012 | Alexander |
| 2013/0024778 | A1 | 1/2013 | Reeves et al. |
| 2013/0055102 | A1 | 2/2013 | Matthews et al. |
| 2013/0057572 | A1 | 3/2013 | Anderson et al. |
| 2013/0073932 | A1 | 3/2013 | Migos et al. |
| 2013/0076591 | A1 | 3/2013 | Sirpal et al. |
| 2013/0167159 | A1 | 6/2013 | Ricci et al. |
| 2013/0179838 | A1 | 7/2013 | LeVee et al. |
| 2013/0187861 | A1 | 7/2013 | Lavallee |
| 2013/0258037 | A1 | 10/2013 | Kim et al. |
| 2013/0278484 | A1 | 10/2013 | Hwang et al. |
| 2013/0283193 | A1 | 10/2013 | Griffin |
| 2013/0332846 | A1 | 12/2013 | Freedman |
| 2013/0335340 | A1 | 12/2013 | Smith |
| 2014/0118222 | A1 | 5/2014 | Barrett et al. |
| 2014/0129695 | A1 | 5/2014 | Yerli |
| 2014/0181715 | A1 | 6/2014 | Axelrod et al. |
| 2014/0244782 | A1 | 8/2014 | Beaurepaire et al. |
| 2015/0324067 | A1* | 11/2015 | Cabral ................. G06F 3/167 715/811 |
| 2016/0070580 | A1 | 3/2016 | Johnson et al. |

FOREIGN PATENT DOCUMENTS

| | | |
|---|---|---|
| WO | 2013171487 A1 | 11/2013 |
| WO | 2014038918 A1 | 3/2014 |

OTHER PUBLICATIONS

"Sprint Echo—Dual-Screen Simul-tasking Phone", Published on: Feb. 10, 2011, pp. 3 Available at: http://www.unp.me/f106/sprint-echo-dual-screen-simul-tasking-phone-139170/.

"Creating Separate Back Stacks for Android Applications Tabs Using Fragments", Published on: Apr. 30, 2013, pp. 3, Available at: http://www.abtosoftware.com/blog/creating-separate-back-stacks-for-android-apps-tabs-using-fragments.

"Providing Proper Back Navigation", Published on: May 18, 2013, pp. 4 Available at: http://developer.android.com/training/implementing-navigation/temporal.html.

Oremland, Paul ., "Building for Multiple Screens", Published on: Oct. 18, 2013, pp. 5 Available at: http://tech.infospace.com/2013/10/18/building-for-multiple-screens/.

Int. Search Report/Written Opinion cited in PCT Application No. PCT/US2015/050664 dated Nov. 27, 2015, 13 pgs.

Int. Search Report/Written Opinion cited in PCT Application No. PCT/US2015/050690 dated Nov. 25, 2015, 10 pgs.

Int. Search Report/Written Opinion cited in PCT Application No. PCT/US2015/050838 dated Jan. 13, 2016, 14 pgs.

Int. Search Report/Written Opinion cited in PCT Application No. PCT/US2015/050846 dated Jan. 5, 2016, 12 pgs.

Int. Search Report/Written Opinion cited in PCT Application No. PCT/US2015/051133 dated Jan. 13, 2016, 14 pgs.

"Google I/O 2014: Android Takes the L", Jun. 25, 2014, reprinted from the Internet at: http://winsupersite.com/mobile-devices/google-io-2014-android-takes-l, 11 pgs.

"Considering CarPlay", Mar. 5, 2014, reprinted from the Internet at: http://getwired.com/2014/03/05/considering-carplay/, 4 pgs.

"Holy Smartphones and Tablets, Batman! Mobile Interaction's Dynamic Duo", Tommaso Piazza, Morten Fjelt, Gonzalo Ramos Asimevren Yantac and Shengdong Zhao, Sep. 24, 2013, In Proceedings of the 11th Asia Pacific Conference on Computer Human interaction, reprinted from the Internet at: http://t2i.se/wp-content/uploads/2014/01/APCHI_2013_v20.pdf, pp. 63-72.

"Multiple TV remotes showcase the evils of complexity. Smart TVs just make it worse", Jan. 13, 2014, reprinted from the Internet at: http://praxtime.com/2014/01/13/multiple-remotes-evil/, 4 pgs.

"Bimodal tablets (Windows and Android)", Jan. 14, 2005, reprinted from the Internet at: http://getwired.com/2014/01/05/bimodal-tablets-windows-and-android-remember-them-when-theyre-gone-again/, 23 pgs.

"MobiToss: A Novel gesture based interface for creating and sharing mobile multimedia art on large public displays", Jurgen Scheible, Timo Ojala and Paul Coulton, Oct. 26, 2008, In Proceedings of Multimedia, reprinted from the Internet at: http://www.mediateam.oulu.fi/publications/pdf/1131.pdf, pp. 957-960.

"Throw and Tilt—Seamless Interaction across Devices Using Mobile Phone Gestures", Raimund Dachselt and Robert Buchholz, Sep. 22, 2008, In Proceedings of 2nd Workshop on Mobile and embedded Interactive Systems, reprinted from the Internet at: https://imld.de/cnt/uploads/2008-MEIS-Throw-and-Tilt.pdf, pp. 272-278.

"Up close with iOS 5: New gestures", Alexandra Chang, Oct. 14, 2011, reprinted from the Internet at: http://www.macworld.com/article/1163019/ios_5_new_gestures.html, 5 pgs.

"Chromecast", Jul. 3, 2014, reprinted from the Internet at: www.goog.ecom/intl/en/chrome/devices/chromecast/, 6 pgs.

"What is Ubuntu for Android?", Jul. 3, 2014, reprinted from the Internet at: http://www.ubuntu.com/phone/ubuntu-for-android, 9 pgs.

"In-Car Entertainment using Mobile Devices: A study on Automotive Manufactures in India", S. Solamalai and Dr. N.R.V. Prabhu, Jun. 30, 2014, In International journal of Engineering Science and Technology, vol. 2, No. 1, reprinted from the Internet at: http://www.estij.org/papers/vol2no12012/4vol2no1/pdf., pp. 26-29.

"Google Chromecast controls TV from smartphones, tablets, laptops", Jul. 24, 2013, reprinted from the Internet at: http://www.computerworld.com/article/2484298/tablets/google-chromecast-controls-tv-from-smartphones--tablets--laptops.html, 5 pgs.

(56) References Cited

OTHER PUBLICATIONS

"Share Android Device Screen with Other Devices", Albert Tang, Dec. 17, 2012, reprinted from the Internet at: http://www.outube.com/watch?v=Ygng30ir1tc, 4 pgs.

"Kyocera's Echo phone bring dual-screens and "Simul-Taking" to Spring", Davindra Hardawar, Feb. 8, 2011, reprinted from the Internet at: http://venturebeat.com/2011/02/08/kyocera-echo/, 4 pgs.

"Design A for P2", Jan. 15, 2013, reprinted from the Internet at: http://boards.openpandora.org/topic/11608-design-a-for-p2, 6 pgs.

"OSX Mavericks Preview: Multiple displays finally Work Like they're supposed to", Peter Cohen, Jul. 8, 2013, reprinted from the Internet at: http://www.imore.com/os-x-mavericks-preview-multiple-displays, 8 pgs.

"User Interfaces When and Where They are Needed: An Infrastructure for Recombinant Computing", Mark W. Newman, Shahram Izadi, W. Keith Edwards, Jana Z. Sedivy and Trevor F. Smith, Oct. 27, 2002, In Proceedings of the 15th Annual ACM Symposium on User Interface Software and Technology, vol. 4, Issue 2, reprinted from the Internet at: http://mwnewman.people.si.umich.edu/pubs/uist2002-controllers.pdf, pp. 171-180.

"Multimodal user interfaces for context-aware mobile applications", Ralf Kernchen, Peter Pal Boda, Klaus Moessner, Bernd Mrohs, Matthieu Boussard and Giovanni Giuliani, Sep. 11, 2005, In IEEE 16th International Symposium on Personal, Indoor and Mobile Radio Communications, vol. 4, reprinted from the Internet at: ieeexplore.ieee.org/stamp/stamp.jsp?tp=&arnumber=1651849, 6 pgs.

"Stanford Interactive Workspaces: A Framework for Physical and Graphical User Interface Prototyping", Jan Borchers, Meredity Ringel, Joshua Tyler and Armando Fox, Dec. 2012, In IEEE Wireless Communication, reprinted from the Internet at: https://hci.stanford.edu/publications/2002/iwork_prototype_ieee/iRoom_SmartHomes_final.pdf, 7 pgs.

"Managing Context Information in Mobile Devices", Panu Korpipaa, Jani Mantyjarvi, Juha Kela, Heikki Keranen and Esk0-Juhani Malm, Jul. 1, 2013, IEEE Pervasive Computing vol. 3, Issue 2, reprinted from the Internet at: http://140.127.22.92/download/learn_web/Tong(93-2)--Distribution_multimedia/database/6-7/ Managing Context Information in Mobile Devices.pdf, pp. 42-51.

"Implicit Human Computer Interaction Through Context", Albrecht Schmidt, Jan. 1, 2000, personal Technologies, vol. 4, No. 2-3, 10 pgs.

"Design of human-centric adaptive multimodal interfaces", J. Kong, W.Y. Zhang, N. Yu and X.J. Xia, Jul. 28, 2011, International Journal of Human-Computer Studies, Academic Press, New York, N.Y., vol. 69, No. 12, 16 pgs.

"A Unifying Reference Framework for multi-target user interfaces", Gaelle Calvary, Joelle Coutaz, David Thevenin, Quentin Limbourg, Laurent Bouillon and Jean Vanderdoncki, Jun. 2003, Interacting with Computers, vol. 15, No. 3, pp. 289-308.

"Virtual Projection: Exploring Optical Projection as a Metaphor for Multi-Device Interaction", Dominikus Baur, Sebastian Boring and Steven Feiner, May 5, 2012, Proceedings of the SIGCHI Conference on Human Factors in Computing Systems, pp. 1693-1702.

"Extending Mobile Interfaces with External Screens", Julian Seifert, Dennis Schneider and Enrico Rukzio, Sep. 2, 2013, In Proceedings of International Federation for Information Processing, reprinted from the Internet at: https://www.uni-ulm.de/fileadmin/website_uni_ulm/iui.inst.100/institut/Papers/Prof_Rukzio/2013/2013-Seifert-et-al_ExtendingMobileInterfaces.pdf, 8 pgs.

"PDAs and Shared Public Displays: Making Personal Information Public, and Public Information Personal", Saul Greenberg, Michael Boyle and Jason Laberge, Jun. 30, 2014, In Proceedings of Personal Technologies, vol. 3, Issue 1-2, reprinted from the Internet at: http://grouplab.cpsc.ucalgary.ca/grouplab/uploads/Publications/Publications/1999-PDAs.PersonalTechnologies.pdf, pp. 54-64.

"Attach me, Detach me, Assemble me like You Work", Donatien Grolauz, Jean Vanderdonckt and Peter Van Roy, Sep. 12, 2005, In Proceedings of Human-Computer Interaction—INTERACT, reprinted from the Internet at: http://www.google.com/url?sa=t &rct=j&q=&esrc= s&source=web&cd=2&ved=0ah UKEwjkmdv Yku7LAhWIQyYKHXCHCE8QFggmMAE&url=http%3A%-2F%2Fwww.usixml.org %2Fservlet% 2FRepository%2Fgrolaux-Interact2005.pdf%3FID%3D1413%26saveFile%3Dtrue &usg=AFQjCNF5aeyzdbIMNCmTIMQvIOuJ4rLECA, 14 pgs.

"A Cross-Device Interaction Style for Mobiles and Surfaces", Donomik Schmidt, Julian Seifert, Enrico Rukzio and Hans Gellersen, Jun. 11, 2012, In Proceedings of the Designing Interactive Systems Conference, reprinted from the Internet at: https://www.uni-ulm.de/fileadmin/website_uni_ulm/iui.inst.100/institut/Papers/Prof_Rukzio/2012-Schmidt-D-A-Cross-Device-Interaction-Style-for-Mobiles-and-Surfaces.pdf, pp. 318-327.

"SlingPlayer for Connected Devices", Jun. 25, 2014, reprinted from the Internet at: http://forms.sling.com/go/spcd, 3 pgs.

Reply Written Opinion cited in PCT Application No. PCT/US2015/050664 dated Jun. 22, 2016, 5 pgs.

Reply Written Opinion cited in PCT Application No. PCT/US2015/050690 dated Apr. 8, 2016, 8 pgs.

Second Written Opinion cited in PCT Application No. PCT/US2015/050690 dated May 27, 2016, 4 pgs.

Reply Written Opinion cited in PCT Application No. PCT/US2015/050838 dated Jun. 24, 2016, 23 pgs.

Reply Written Opinion cited in PCT Application No. PCT/US2015/050846 dated May 19, 2016, 25 pgs.

Reply Written Opinion cited in PCT Application No. PCT/US2015/050866 dated May 2, 2016, 20 pgs.

Reply Written Opinion cited in PCT Application No. PCT/US2015/051133 dated Jul. 22, 2016, 24 pgs.

Non-Final Office Action cited in U.S. Appl. No. 14/495,443 dated Aug. 26, 2016, 44 pgs.

Int. Search Report/Written Opinion cited in PCT Application No. PCT/US2015/050866 dated Jan. 8, 2016, 14 pgs.

Reply Written Opinion cited in PCT Application No. PCT/US2015/050866 dated Mar. 18, 2016, 12 pgs.

"Second Written Opinion Issued in PCT Application No. PCT/US2015/050866", dated Aug. 1, 2016, 8 Pages.

Int. Preliminary Report cited in PCT Application No. PCT/US2015/050866 dated Jan. 11, 2017, 24 pgs.

* cited by examiner

COMPONENT-SPECIFIC APPLICATION PRESENTATION HISTORIES

BACKGROUND

Within the field of computing, many scenarios involve a presentation of an application by a device having at least two presentation components. As a first such example, a device may comprise two or more displays, and may present a computing environment across the two or more displays. As a second such example, a display may comprise a display and a pair of headphones, and may present the application visually upon the display and/or audially through the headphones. As a third such example, a device may have access to remote display components of one or more other devices, such as remote terminal sessions, projectors, or sets of remote speakers, and may transmit the application presentation to one or more of the remote display components for presentation.

The manner of choosing a presentation component upon which to present an application is often delegated to the user. As a first such example, among several displays that are accessible to a device, a user of a visual application may specify a selected display (e.g., moving a window to a specific display), and the device may display the application on the selected display. As a second such example, a user may request to play music, and the device may present a list of audio devices that are accessible to the device and are capable of rendering the music for the user. The user may then select an audio device, and the device may play the music through the selected audio device.

Additionally, many such devices maintain a history of applications that have been presented within the computing environment of the device. For example, an application switcher or "Alt-Tab" list may indicate the set of recently presented applications, optionally including an application presentation order, in which the applications have been presented to and/or activated by the user (e.g., a current application and a previous application). Upon receiving a request to transition from a current application to a second application (such as a "next" application in the application order), the device may transition the computing environment to the second application (e.g., raising the "Z-order" of a window for the application in a window stack presented on a display of the device, in order to present the second application in the foreground of the computing environment).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The presentation of applications in a computing environment of a device may exhibit various limitations, due in part to the complexity and/or robustness of modern devices, particularly for devices having access to a variety of presentation components.

As a first such example, the device may have a comparatively large number of presentation components, and the user may execute a comparatively large number of applications therethrough. Selecting the second application to which the user wishes to transition may be difficult due to the large number of applications that may be included in the application presentation history. For example, if the user wishes to navigate backward in an application presentation history (such as an application stack), the application that the individual wishes to activate may be positioned deep within the application presentation history, and it may take the user a while to find the application that the user wishes to be presented.

As a second such example, the presentation components of the device may vary in various respects; e.g., some devices may be associated with various input/output modalities, locations, or user contexts. Moreover, the user may intend to request the presentation of an application on a particular presentation component, but may not specify which presentation component. However, identifying a presentation component for the presentation of a particular application may be difficult to determine.

Presented herein are techniques for enabling devices to facilitate a user in navigating among the presentation of applications on the device. In accordance with these techniques, for the respective presentation components that are accessible to the device, the device may generate an application presentation history that identifies the application presentations of applications that have been presented through the presentation component. Responsive to presenting an application presentation of a selected application through a selected presentation component, the application may record the application presentation in the application presentation history of the selected presentation component; and responsive to receiving a request to transition a selected presentation component away from a current application, the device may select a second application from the application presentation history of the selected presentation component, and transition the selected presentation component from the current application to the second application.

As one such example, the application may generate an application switch list (e.g., an "Alt-Tab" list or an application stack) for each presentation component, indicating the application presentations that have been presented on the device. When the user specifies a request to transition a selected display component away from a current application (e.g., a "Back" operation), the device may identify the applications that have been particularly displayed on the selected display, and may present a second or "next" application from the application presentation history on the display. In this manner, the techniques presented herein may enable a device to facilitate the user in the navigating among the application presentations on the various presentation components of the device.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
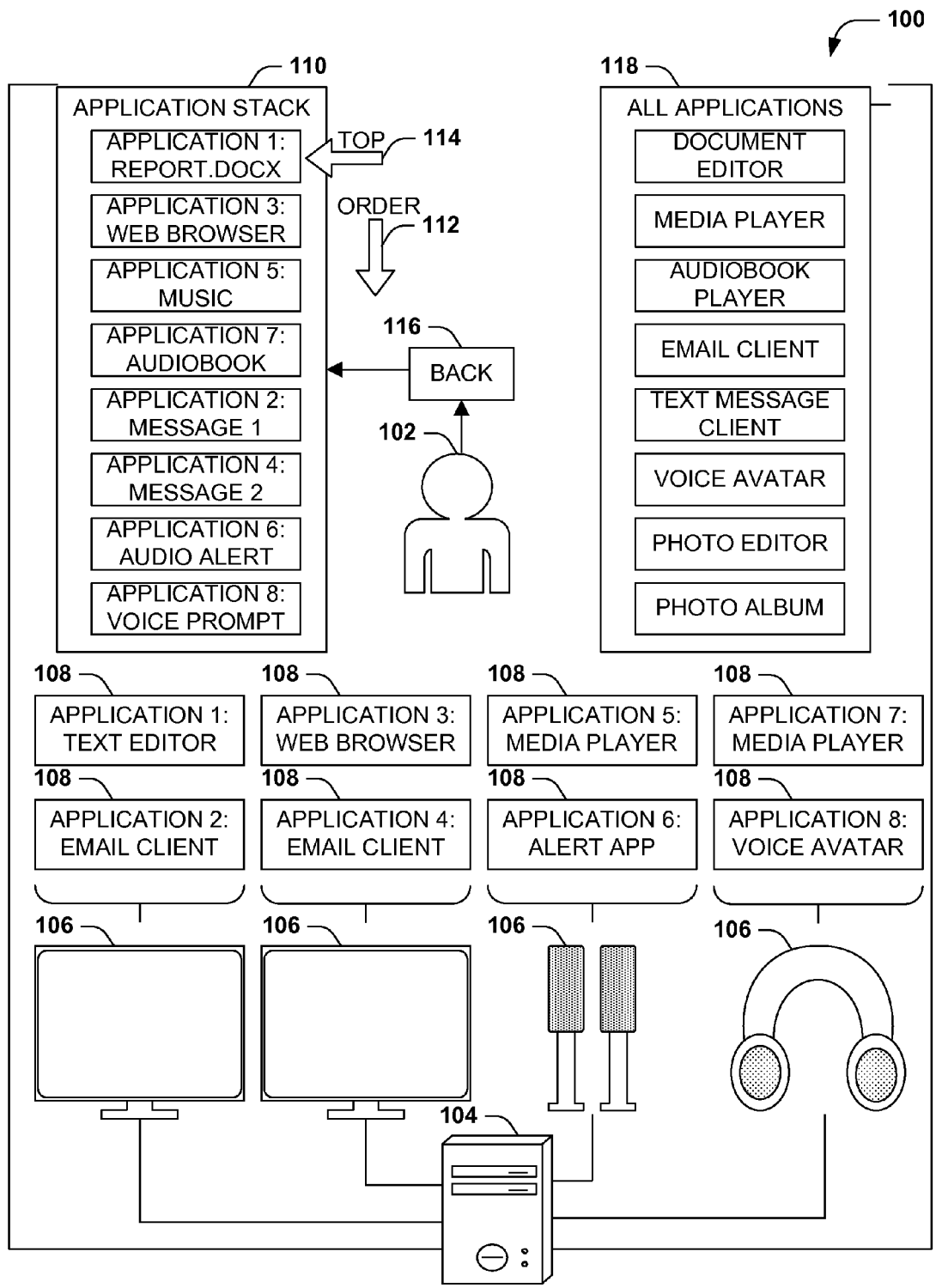
FIG. 1 is an illustration of an example scenario featuring a presentation of applications on various presentation components of a device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 presents an illustration of an example scenario 100 featuring an interaction of a user 102 with a device 104 utilizing a set of presentation components 106 in order to present a set of applications 108. In this example scenario 100, the presentation components 106 of the device 104 include two distinct displays; a pair of speakers; and a pair of headphones. The applications 108 presented by a computing environment of the device 104 include a variety of functionality, such as a text editor used to create a report; a messaging client, such as an email client, that presents a set of messages; a web browser that interacts with webservers over a network and renders web pages; a media player that renders various forms of media, such as music, videos, and audiobooks; an alert app that presents alerts to the user 102 on various topics, such as breaking news, the weather, or the arrival of mail; and a voice avatar that interacts with the user 102 through a voice interface.

As further illustrated in this example scenario 100, in order to enable access to the various applications 108, the device 104 may allow the user 102 to specify the presentation component 106 to be utilized for each application 108. As a first example, the user 102 may wish the text editor application 108 to be presented on the first display, and so may instantiate the text editor application 108 and position a window containing the application 108 in a particular region of the first display. As a second example, the user 102 may wish to view mail on both the first display and the second display, and so may request an email client application 108 to render different messages on each display. As a third example, the user 102 may request to play different types of audio output through a media player to different audio devices (e.g., playing music through the speakers while playing an audiobook through the headphones), and may therefore request the media player 108 to direct each audio stream to the appropriate audio device.

As further illustrated in this example scenario 100, as the user 102 utilizes applications 108, the device 104 may generate and maintain an application stack 110, with a stack order 112 that is ordered, in descending manner, according to the latest chronological access of the applications 108 by the user 102. For example, if the user 102 selects the text editor application 108, the device 104 may move the text editor application 108 to the top 114 of the application stack 110 (e.g., indicating that the text editor application 108 currently has input focus, and/or is the "topmost" application 108 that has the latest date of user activation among all of the applications 108 of the device 104). The device 104 may render the applications 108 in the application stack 110 in various ways; e.g., using a Z-order of the applications 108, the device 104 may present the application 108 on the top 114 of the application stack 110 in a foreground position, and may present the successive applications 108 at a lower Z-order in increasingly background positions. Moreover, the user 102 may request an application 108 to utilize multiple presentation components 106 concurrently; e.g., the email client application 108 may concurrently present messages on each of two devices, and the web browser 108 may present a web page on a display presentation component 106 and play audio associated with the web page through the speaker presentation component 106. Notably, as illustrated in the example scenario 100 of FIG. 1, the device 104 utilizes a shared application stack 110, where the instantiation and/or invocation of any application 108 causes the insertion of an entry on the application stack 110, irrespective of where the application 108 is presented.

The device 104 may also use the application stack 110 to enable the user 102 to navigate among the applications 108. As a first such example, if the user 102 initiates a "back" operation 116 requesting a transition of the device 104 away from a current application 108 on the top 114 of the application stack 110, the device 104 may identify a second application 108 that is lower in the application stack 110, and may reorder the order 114 of the application stack 110 to place the second application 108 above the current application 108 formerly on the top 114 of the application stack 110. As a second such example, the device 104 may present to user 102 a complete list of all applications 108 that are currently running on the device (e.g., a process list) in order to select a particular application 108; and responsive to the user 102 initiating such selection of the application 108, the device 104 may place the selected application 108 on the top 114 of the application stack 110. As a third such example, the device 104 may present to the user 102 a list or menu 118 of all applications 108 that are available to and may execute on the device 104. Responsive to receiving a selection of such an application 108 from the user 102, the device 104 may instantiate the application 108 if it is not already running (or may create an additional instance if the application 108 is already running), may insert the selected application 108 into the top 114 of the application stack 110, and may present the application instance to the user 102. In this manner, the device 104 may enable the user 102 to utilize a variety of techniques to enable the user 102 to navigate among the applications 108 executing on the device 104.

However, the example scenario 100 of FIG. 1 also illustrates a number of disadvantages that may arise in implementations of such application selection techniques.

As a first such example, the device 104 may include a comparatively large set of presentation components 106. Such presentation components 106 may even be remote form the physical location of the device 104, such as a projector or speakers positioned in another room, building, or city. The user 102 may be frustrated by having to select, for each application 108, the presentation device 106 upon which the application 108 may be presented. If the device 104 comprises a large number of displays, it may be frustrating for the user 102 to choose and manage the selection of the particular presentation component 104 upon which the application 108 is presented. For example, presenting the complete list of applications 108 in the application stack 110 and/or the all applications menu 118 may frustrate and/or visually overwhelm the user 102 if the list includes a potentially large number of applications 108.

As a second such example, the device 104 may include a comparatively large number of executing and/or potentially executable applications 108. Managing the presentation of such a large number of applications 108 may become difficult. For example, if the user 102 opens a number of email messages through the same email client application 108, it may be frustrating if the messages all open on the same display, while other displays may remain unused. Conversely, the user 102 may be frustrated by the distribution of email messages across a multitude of displays, and may have difficulty finding and managing the collection of open email messages. Moreover, even if the user 102 is able to find the batch of related email messages, the user 102 may have to rearrange the positions and sizes of the email messages presented on the respective displays in order to read the messages together.

As a third such example, the selection of a particular application 108 by the user 102 may be complicated by a comparatively large number of presentation components 106 and/or applications 108. As a first such example, in order to select a particular application 108 for interaction, the user 102 may attempt to page incrementally through the application stack 110. However, if the application 108 is buried deep within the order 112 of the application stack 110, the user 102 may have difficulty locating the application 108. Moreover, while the user 102 toggles among the applications 108 of the application stack 102 according to the stack order 112, various presentation components 106 may receive and/or lose input and output focus, which may create the appearance of a disorganized computing environment to the user 102.

As a fourth such example, when the user instantiates and/or activates an application 108, the device 104 may activate an application 108 in the application stack 110, but may not adequately notify the user 102 of the presentation component 106 for the application 108. For example, the "back" operation 116 may be performed without notifying the user 102 of application 108 and/or presentation component 106 has been selected for the new topmost presentation. The user 102 may therefore have to explore the presentation devices 106 individually, and possibly at length, in order to determine the current focus of user input and output. Such confusion may also arise when the user 102 requests to open a new application 108; the device 104 may select a presentation component 106 and instantiate the application 108 on the selected presentation component 106, but may fail to notify the user 102 as to which presentation component 106 has been selected. Indeed, the user 102 may not even comprehend that the request to instantiate the application 108 has been fulfilled by the device 104. In some scenarios, such selection may be performed arbitrarily, or at least may appear to be arbitrary to the user 102, thereby exacerbating the frustration of the user 102 while interacting with a multitude of applications 108 on the device 104. For example, the user 102 may understand that both a topmost application 108 and a second application 108 on the application stack 110 are presented on a first display, but may not understand that a third application 108 presented on a second display is located in the application stack 110 between such applications. In requesting a "back" operation 116, the user 102 may anticipate a transition of the device 102 to the second application 108 and may watch the first display for a response, and may fail to notice the activation of the third application 108 on the second display. Moreover, the user 102 may provide user input to the device 104 intending to interact with the second application 108 (e.g., entering text on a keyboard that is intended for the second application 108), but the user input may be inadvertently directed to the third application 108 instead of the second application 108.

As a fifth such example, a visually overwhelming consequence of such presentation of applications 108 may be exacerbated by applications 108 providing a variety of application views; e.g., if the email client presents a different application window 110 for each message, the application list may become unwieldy if the user 102 is concurrently viewing a dozen or more email messages. Conversely, the application stack 110 may group application views of the same application 108 together in the application stack 110, and/or may consolidate the presentation of multiple views of a selected application 108 as one entry in the application stack 110, but such grouping and/or consolidation within the application stack 110 may interfere with the capability of the individual to access a specific application view. For example, in some scenarios, an application 108 may refrain from overutilizing the application stack 110 by refraining from inserting an entry for a particular application view (e.g., a media player may refrain from inserting distinct entries for music playing through different audio components), but such refraining may frustrate a user 102 who seeks to activate and interact with a particular application view via the application stack 110. These and other difficulties may arise in the presentation of the applications 108 of the computing environment of the device 104 using a shared application stack 110 in the manner presented in the example scenario 100 of FIG. 1.

B. Presented Techniques

Presented herein are techniques for configuring a device 104 to present applications 108 to a user 102 of a device 104 having at least two presentation components 108. In accordance with such techniques, the device 104 may generate and maintain, for each presentation component 106, a distinct application presentation history that indicates the application presentations of the applications 108 that have been presented on the presentation component 106. When the user 102 requests a transition away from a current application presentation on a selected presentation component (e.g., requesting a "back" operation on a particular display), the device 104 may limit the transition from the current application presentation to the other application presentations on the same presentation component 106. In this manner, the intent of the user 102 to toggle among the application presentations that are specific to each presentation component 106 may be fulfilled in an intuitive and efficient manner.

Figure 2:
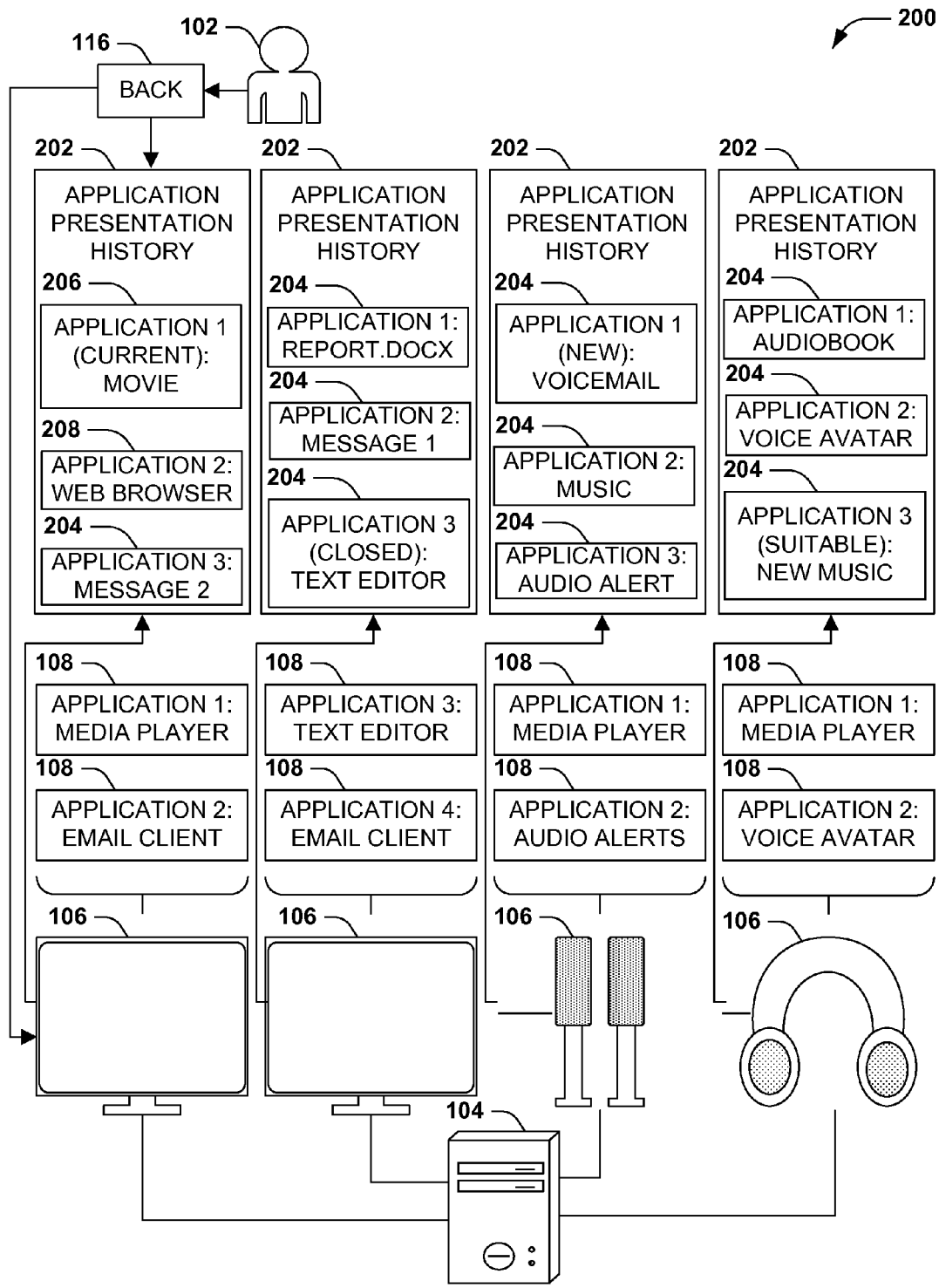
FIG. 2 is an illustration of an example scenario featuring a presentation of applications on various presentation components of a device, in accordance with the techniques presented herein.

FIG. 2 presents an illustration of an example scenario 200 featuring an interaction of a user 102 with the applications 108 presented on various presentation components 106 of a device 104 in accordance with the techniques presented herein. In this example scenario 200, the device 104 executes a variety of applications 108, each presenting one or more application presentations 204 (e.g., windows, full- or part-region displays, images, user controls, application icons, menu bar icons, media streams, and gaming sessions) on various presentation components 106 of the device 104, such as a pair of displays, a pair of speakers, and a headphones device. The respective applications 108 may also present one or more application views, such as an email client that presents distinct application views for each of several email messages, which may be presented on the same or different presentation components 106.

In accordance with the techniques presented herein, the device 104 generates, for each presentation component 106, a distinct application presentation history 202, indicating the application presentations 208 of the applications 108 that have been presented on the presentation component 106. Responsive to presenting an application presentation 204 on a selected presentation component 106, the device 104 records the application presentation 204 in the application presentation history 202 for the presentation component 106. Such recording of application presentations 204 specific to each presentation component 106 may facilitate the navigation by the user 102 among the application presentations 204 of the computing environment of the device 104. For example, responsive to receiving a request from the user 102 to transition a selected presentation component 106 away a current application presentation 206 (e.g., the application presentation 204 having a topmost position in the application presentation history 202 for the presentation component 106), the device 104 selects a second application presentation 208 from the application presentation history 202 of the selected presentation component 106, and transitions the selected presentation component 106 from the current application presentation 206 to the second application presentation 208. In this manner, the device 104 may permit the user 102 to initiate a "back" operation 116 for a selected display in order to navigate, toggle, and/or transition only among the application presentations 108 provided on the selected display, in accordance with the techniques presented herein.

C. Technical Effects

The use of the techniques presented herein to transition among the application presentations 204 of respective applications 108 on the device 104 may result in a variety of technical effects.

As a first example of a technical effect that may be achievable by the techniques presented herein, a device 104 utilizing the techniques presented herein may permit the user 102 to transition among application presentations 208 in an intuitive manner. Rather than navigating through an entire set of application presentations 204 provided on any of the presentation components 106, such a device 104 may constrain the set of application presentations 208 among the navigation set to those that are within the application presentation history 202 of a selected presentation component 106. The application transition and navigation functionality of the computing environment may therefore provide a more efficient and understandable user interface and user experience for the user 102.

As a second example of a technical effect that may be achievable by the techniques presented herein, a device 104 utilizing the techniques presented herein may present greater scalability to enable interaction of the user 102 with a larger number of applications 108 and presentation components 106. For example, a device 104 presenting a large number of displays (e.g., more than twenty displays) may present a comparatively frustrating user experience to the user 102 who seeks to interact with applications 108 presented across all such displays, particularly where such applications 108 are part of the same computing environment. The techniques presented herein may facilitate such access by the user 102, thereby reducing the user interface and management barriers to adding presentation components 106 to the device 104, and enabling the user 102 to interact concurrently with a large number of applications 108 presented across many such presentation components 106, while rapidly switching thereamong with greater fluency and speed.

As a third example of a technical effect that may be achievable by the techniques presented herein, a user interface that allows the user 102 to transition among the application presentations 204 for a particular presentation component 106 may reduce the incidence of user confusion (e.g., where the user 102 is uncertain which application 108 currently has focus, or even whether a request to instantiate and/or activate a particular application presentation 204 has been received and fulfilled). Such techniques may also reduce errors in user input, such as where the user 102 intends to activate and interact with a particular application presentation 204, but inadvertently activates and provides the user input to a different application presentation 204 on a different presentation component 106. Many such instances of user input errors, inconsistencies, and user misunderstanding may be avoided by enabling application presentation transition in accordance with the techniques presented herein.

As a fourth example of a technical effect that may be achievable by the techniques presented herein, the recording of application presentations 204 of respective applications 108 in distinct application presentation histories 202 for respective presentation components 106 may enable a variety of features that are not as readily achievable through other techniques. As a first such example, recording the application presentation history 204 of a particular application 108 may enable the subsequent selection and utilization of the same presentation component 106 for the same application 204; for different application presentations 204 of the same application 204; and/or for different but similar applications 204. For example, when the user 102 requests to listen to a voicemail message, the application presentation histories 202 of the respective presentation components 106 may be examined to determine which presentation component 106 the user 102 frequently selects for the presentation of such messages, and/or to determine which presentation component 106 is suitable for a particular application presentation 204 (e.g., based on the other application presentations 204 that are currently and/or formerly provided on the respective presentation components 106). Moreover, the configuration of a device 104 to record application presentation histories 202 for respective presentation components 106 may confer consistent application behavior among all applications 108 executing on the device 104, rather than delegating the selection among the presentation components 106 to the applications 108. These and other technical effects may be achievable through the configuration of the device 104 to transition among the application presentations 204 of respective applications 108 on the device 104 in accordance with the techniques presented herein.

D. Example Embodiments

Figure 3:
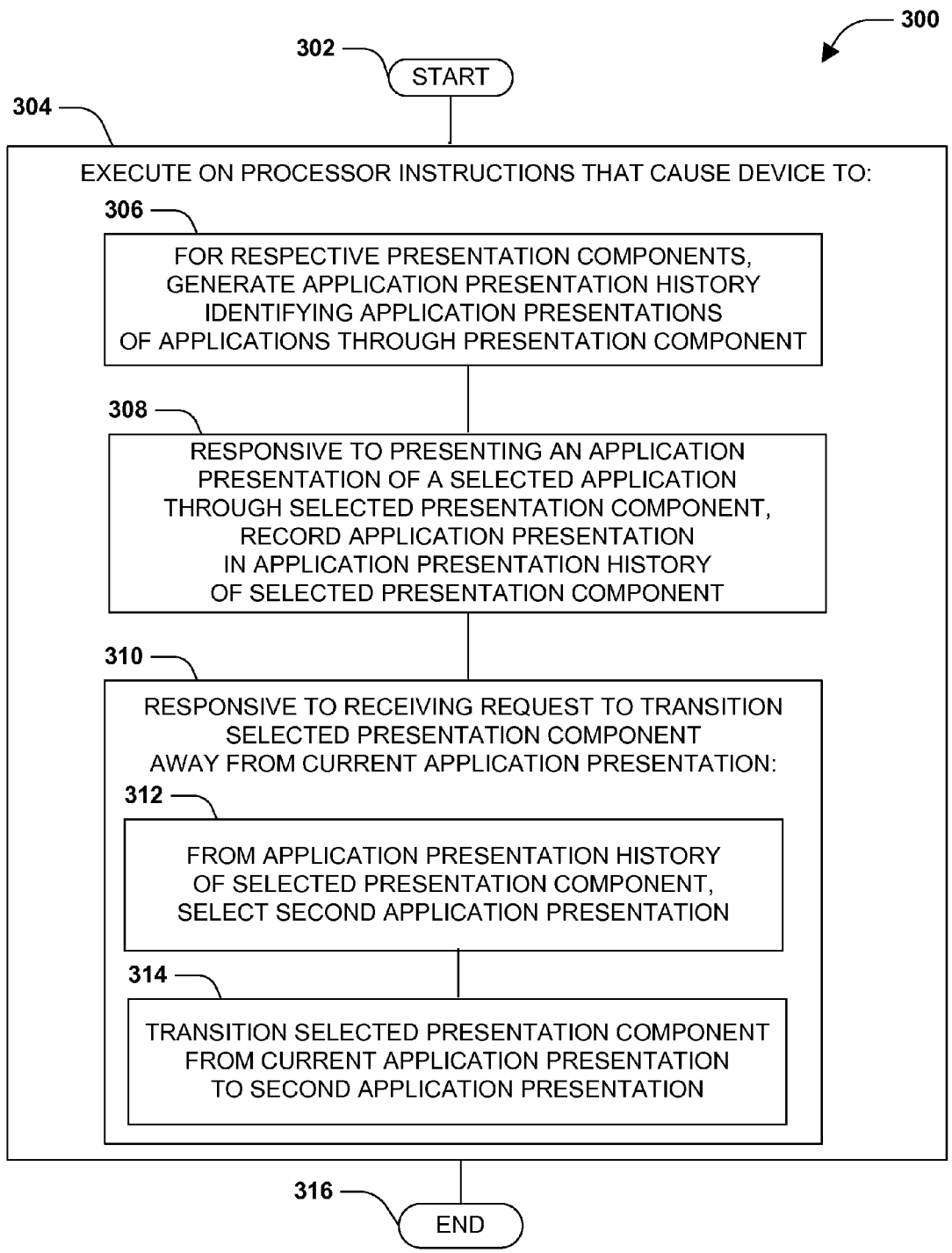
FIG. 3 is a flow diagram of an example method of presenting applications on a device having at least two presentation components, in accordance with the techniques presented herein.

FIG. 3 presents a first example embodiment of the techniques presented herein, illustrated as an example method 300 of configuring a device 104 to present applications 108 on at least two presentation devices 106. The example method 300 may be implemented, e.g., as a set of instructions stored in a memory component of the device 104, such as a memory circuit, a platter of a hard disk drive, a solid-state storage device, or a magnetic or optical disc, and organized such that, when executed on a processor of the device, cause the device 104 to operate according to the techniques presented herein.

The example method 300 begins at 302 and involves executing 304 the instructions on a processor of the device. Specifically, executing 304 the instructions on the processor causes the device 104 to, for respective presentation components 106, generate 306 an application presentation history 202 that identifies the application presentations 204 of applications 108 through the presentation component 106. Executing 304 the instructions on the processor also causes the device 104 to, responsive to presenting an application presentation 204 of a selected application 108 through a selected presentation component 106, record 308 the application presentation 204 in the application presentation history 202 of the selected presentation component 106. Executing 304 the instructions on the processor also causes the device 104 to, responsive 310 to receiving a request to transition a selected presentation component 106 away a current application presentation 206, select 312, from the application presentation history 202 of the selected presentation component 106, a second application presentation 208; and transition 314 the selected presentation component 106 from the current application presentation 206 to the second application presentation 208. In this manner, the instructions cause the device 104 to present applications 102 on the respective presentation components 106 in accordance with the techniques presented herein, and so ends at 316.

Figure 4:
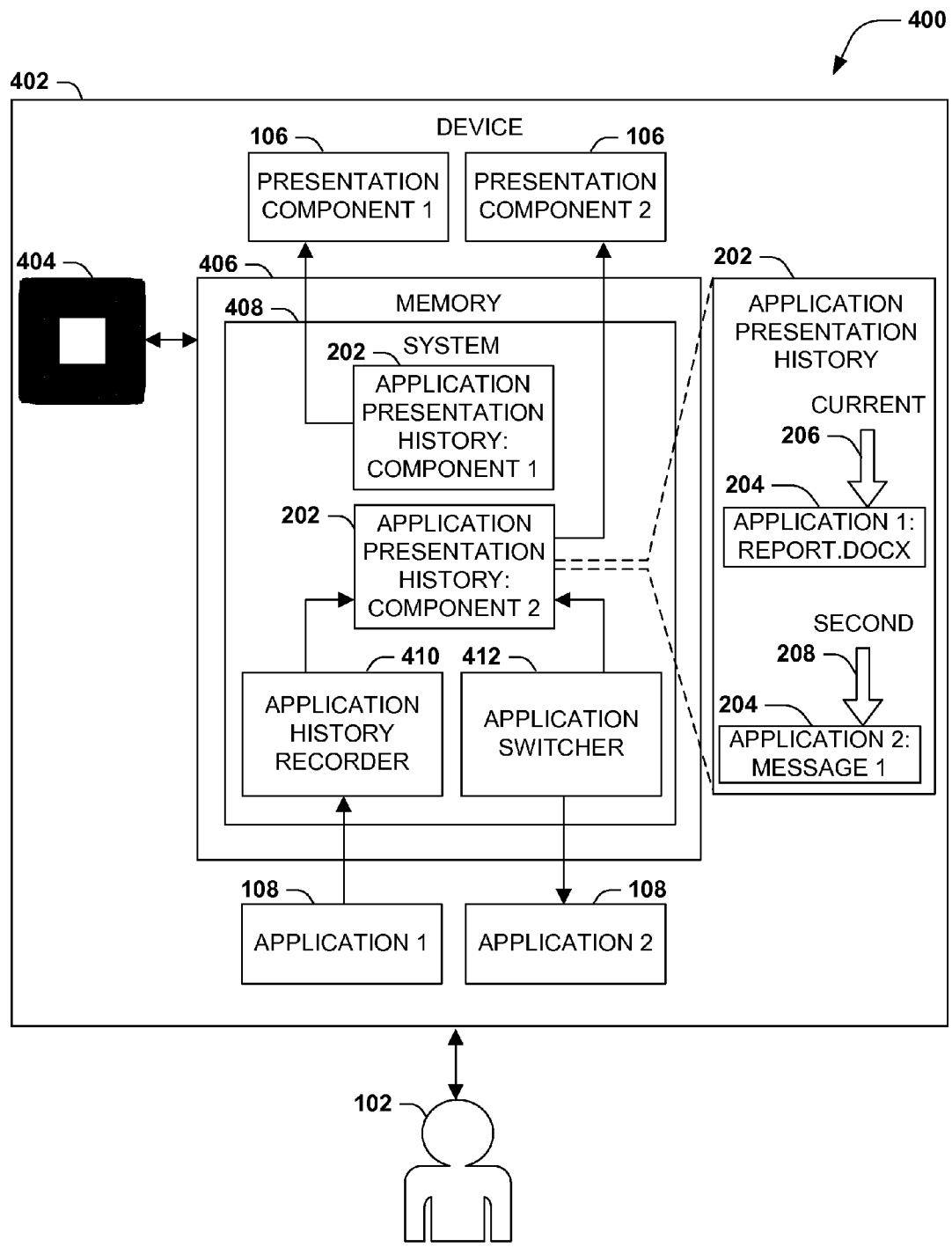
FIG. 4 is a component block diagram of an example system provided to present applications on a device having at least two presentation components, accordance with the techniques presented herein.

FIG. 4 presents a second example embodiment of the techniques presented herein, illustrated as an example system 408 implemented on an example device 402 featuring a processor 404, a memory 406, and at least two presentation components 106, where the example system 408 causes the device 402 to present applications 108 in accordance with the techniques presented herein. The example system 408 may be implemented, e.g., as a set of components respectively comprising a set of instructions stored in the memory 406 of the device 402, where the instructions of respective components, when executed on the processor 404, cause the device 402 to operate in accordance with the techniques presented herein.

The example system 408 includes, for the respective presentation components 106, an application presentation history 202 that identifies the application presentations 204 of applications 108 through the presentation component 106. The example system 408 also includes an application history recorder 410 that, responsive to presenting an application presentation 204 of a selected application 108 through a selected presentation component 106, records the application presentation 204 in the application presentation history 202 of the selected presentation component 106. The example system 408 also includes an application switcher 412 that, responsive to receiving a request to transition a selected presentation component 106 away a current application presentation 206, selects a second application presentation 208 from the application presentation history 202 of the selected presentation component 106, and transitions the selected presentation component 106 from the current application presentation 206 to the second application presentation 208. In this manner, the example system 408 enables the device 402 to present the applications 108 on the at least two presentation components 106 in accordance with the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
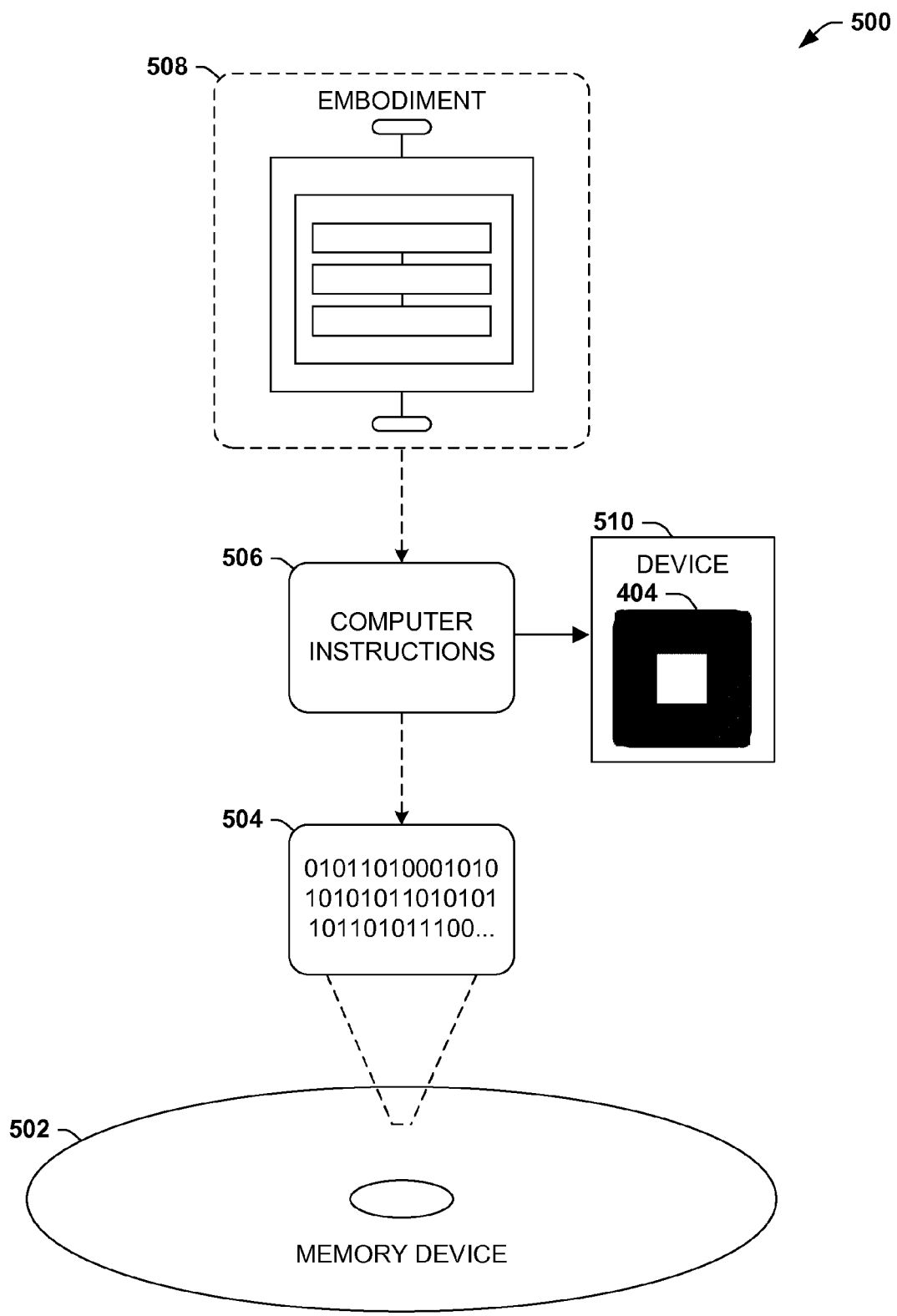
FIG. 5 is an illustration of an example computer-readable medium comprising processor-executable instructions configured to embody one or more of the provisions set forth herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 404 of a device 510 having at least two presentation components 106, cause the device 510 to operate according to the principles set forth herein. In a first such embodiment, the processor-executable instructions 506 may cause the device 510 to perform a method of presenting applications 108 on a device 104 having at least two presentation components 106, such as the example method 300 of FIG. 3. In a second such embodiment, the processor-executable instructions 506 may cause the device 510 to present applications 108, such as the example system 408 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example system 408 of FIG. 4; and the example memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized to achieve the configuration of a variety of devices 104, such as workstations, laptops, tablets, mobile phones, game consoles, portable gaming devices, portable or non-portable media players, media display devices such as televisions, appliances, home automation devices, computing components integrated with a wearable device integrating such as an eyepiece or a watch, and supervisory control and data acquisition (SCADA) devices.

As a second variation of this first aspect, the techniques presented herein may be utilized with a variety of applications 108 having an application presentation 204, such as office productivity applications; media presenting applications, such as audio and video players; communications applications, such as web browsers, email clients, chat clients, and voice over IP (VoIP) clients; navigation applications, such as geolocation, mapping, and routing applications; utilities, such as weather and news monitoring applications that present alerts to the user 102; and games. Moreover, the application presentation 204 of the applications 108 may involve one or more presentation modalities, such as text, images, live and/or prerecorded video, sound effects, music, speech, tactile feedback, three-dimensional rendering, and interactive and/or non-interactive user interfaces, as well as various techniques for receiving user input from the user 102, such as text input, pointing input, tactile input, gestural input, verbal input, and gaze tracking input.

As a third variation of this first aspect, the techniques presented herein may be utilized with a variety of architectures of devices 104 and presentation components 106. As a first such example, the device 104 may utilize one or more presentation components 106 that are directly and physically connected to the device 104, such as wired displays, speakers, and headphones. As a second such example, the device 104 may utilize one more presentation components 106 that are accessible via a wireless connection, such as a radiofrequency. As a third such example, the device 104 may utilize one or more presentation components 106 that are accessible over a network, such as a display to which the device 104 streams video over the internet. As a fourth such example, the device 104 may utilize one or more presentation components 106 that are accessible through a second device 104, such as in a client/server or peer-to-peer architecture. Moreover, such devices 104 and/or presentation components 106 may be utilized by one user 102 or a group of users 102, and/or may be controlled by at least one first user 102 on behalf of at least one second user 102. These and other scenarios may be suitable for the presentation of applications 108 on the presentation components 106 of a device 104 in accordance with the techniques presented herein.

E2. Application Presentation and Application Presentation History

A second aspect that may vary among embodiments of the techniques presented herein relates to the nature of the application presentation 204 of the applications 108 on one or more presentation components 106, and the recordation of the application presentation history 202 of the application presentations 204 on the respective presentation components 106.

As a first variation of this second aspect, the application presentation history 202 of the respective presentation components further represents an application order history, in which the application presentations 204 have been presented through the presentation component 206. As one such example, the application presentation history 202 may exhibit a stack order 112 in which the application presentations 204 have been presented through the presentation component 206, and/or in which the user 102 has selected and/or interacted with the application presentations 204. Selecting a second application presentation 208 in the context of transitioning away from the current application presentation 206 may therefore comprise selecting the second application presentation 208 that precedes the current application presentation 206 in the application order history of the application presentation history 202 for the selected presentation component 106. Alternatively or additionally, the application presentation history 202 may be sorted in other ways, such as the invocation order of the application presentations 204 (e.g., presenting the recently instantiated applications 202 before less recently instantiated applications 202); the preference of the user 102 for respective application presentations 206 (e.g., the user 102 may request that the application presentations 204 of media applications 108, such as video, are to be selected before and/or presented in the Z-order above the application presentations 204 of other applications 108); priority and/or urgency (e.g., urgent informational messages may be inserted into the application presentation history 202 with a higher position than routine or less significant application presentations 204); and/or resource utilization (e.g., application presentations 204 that involve significant computational resources, such as network bandwidth and/or processor capacity, may be presented above other application presentations 204 involving less significant computational resources). Alternatively or additionally, the application presentation history 202 may consolidate, group, and/or otherwise associate the application presentations 204 of the application presentation history 202 that are associated with a particular application 108. As one such example, a selected application 108 may further comprise at least two application views. The recording of the application presentations 204 may therefore comprise, responsive to presenting a selected application view of a selected application 108 through a selected presentation component 106, recording the application presentation of the selected application view of the selected application into the application presentation history 202 of the selected presentation component 106. For example, an email client that concurrently and distinctly presenting a number of email messages, and upon presenting one such message on a selected presentation component 106, the device 104 the may group the application presentations 204 of the respective email messages in the application presentation history 202 of the selected presentation component 106.

As a second variation of this second aspect, the device 104 may use the application presentation history 202 of the respective presentation components 106 to assist the user 102 in selecting a particular application presentation 204 for presentation on the selected presentation component 106. For example, the device 104 may present to the user 102 a list of the applications 108 having at least one application presentation 108 in the application presentation history 202 on the selected presentation component 106, and responsive to receiving from the user 102 a selection of a second application 108, may transition the selected presentation component 106 form the current application presentation 206 to the second application presentation 208 selected from among the application presentations 204.

Figure 6:
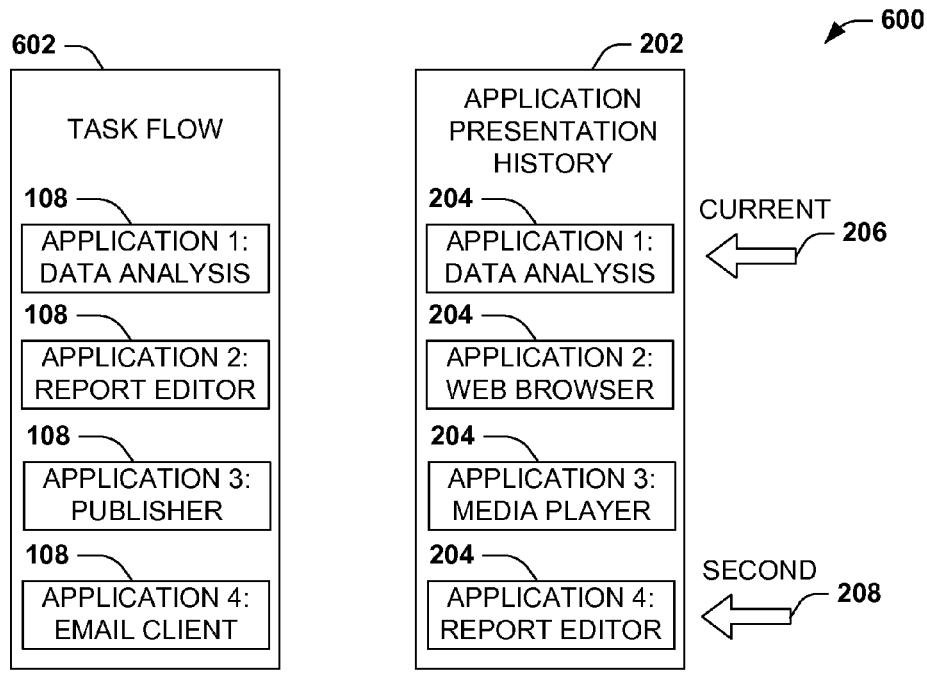
FIG. 6 is an illustration of an example scenario featuring a transition of a presentation component from a current application presentation to a second application presentation according to a task flow, in accordance with the techniques presented herein.

FIG. 6 presents an illustration of an example scenario 600 featuring one such technique for selecting the second application presentation 208 from among the application presentations 204 in the application presentation history 202 of a presentation component 106. In this example scenario 600, the application presentation history 202 indicates that the presentation component 106 is currently presenting several application presentations 204, including a current application presentation 206. Moreover, the current application presentation 204 is associated with a task flow 602, involving a number of steps of the task that are to be performed in a task order through various applications 108. For example, the user 102 may frequently generate reports for clients by following a task flow 602 that involves a data analysis step performed with a data analysis application 108; a report editing step performed with a report editor application 108; a publication step performed with a publisher application 108; and a reporting step performed with an email client 108. Moreover, the respective application presentations 204 in the application presentation history 202 may be correlated with the steps of the task flow 602, and the device 104 may facilitate the user 102 in completing the tasks according to the task order. Accordingly, upon receiving from the user 102 a request to transition from a current application presentation 206 that is associated with a first application 108 of the task flow 602 (e.g., detecting that the user 102 has completed the first step of the task flow 602), the device 104 may select the second application presentation 208 that follows the current application presentation 206 in the task order of the task flow 602.

As a third variation of this second aspect, the application presentation 204 on a selected presentation component 106 may be achieved in various ways. As a first such example, where the selected presentation component 106 further comprises a display, an application order history may be associated with a Z-order of application presentations 204 that are presented on the display; and transitioning the selected presentation component 106 from the current application presentation 206 to the second application presentation 208 may be achieved by reordering the second application presentation 208 above the current application presentation 206 in the Z-order of the display. As a second such example, the device 104 may present the current application presentation 206 as a full-display presentation, and may transition to the second application presentation 208 by replacing the full-display current application presentation 206 with the second application presentation 208 (optionally using a visual transition, such as a fade, wipe, slide, or dissolve transition). As a third such example, the device 104 may apply a layout to the presentation component 106; e.g., the application presentations 204 may be visually arranged on a display in accordance with the application presentation history 202, such as presenting the current application presentation 206 at a top vertical position of the display, and transitioning to the second application presentation 208 by moving the current application presentation 206 vertically downward and inserting the second application presentation 208 vertically above the current application presentation 206. As a fourth such example, the device 104 may comprise a presentation queue, such as an audio device (e.g., speakers) that prioritizes audio application presentations 204, such that only the current application presentation 206 in the application presentation history 202 may utilize the speakers at a current time, or may have the highest volume among concurrently presented audio application presentations 204. Accordingly, the audio presentation component 106 may transition to the second application presentation 208 by suspending or diminishing the current application presentation 206 (e.g., fading out and/or reducing the volume of the audio of the current application presentation 204) in favor of the audio of the second application presentation 208. Many such techniques may be utilized to represent the application presentation history 202, and to present and transition among the application presentations 204, in accordance with the techniques presented herein.

E3. Application Presentation Types

A third aspect that may vary among embodiments of the techniques presented herein involves the type of application presentation 204 provided on the selected presentation component 106.

In accordance with the techniques presented herein, the respective application presentations 204 maybe are associated with an application presentation type. For example, the application presentations 204 may variously comprise a user-interactive or non-user-interactive presentation; a presentation utilizing various input modalities (e.g., keyboard, pointer, voice, and/or gesture) and/or output modalities (e.g., text, image, video, sound, speech, and/or tactile); and a presentation involving various amounts of user attention (e.g., application presentations 204 involving deep, involved, and/or protracted user attention engagement, and application presentations 204 involving casual, superficial, and/or ephemeral user attention engagement). Alternatively or additionally, respective presentation components 106 may be associated with an application presentation type; e.g., the user 102 may utilize a desktop display presentation component 106 to engage with involved and protracted application presentations 204, a mobile display presentation component 106 to engage in casual application presentations 204, and a dash-mounted presentation component 106 providing a vehicle interface to application presentations 204 only to engage in selective and vehicle-oriented interaction. Accordingly, an embodiment of the techniques presented herein may, while transitioning a selected presentation component 106 to the second application presentation 208, adjust the second application presentation 208 to suit the application presentation type that is associated with the second application presentation 208 and/or the selected presentation component 106.

Figure 7:
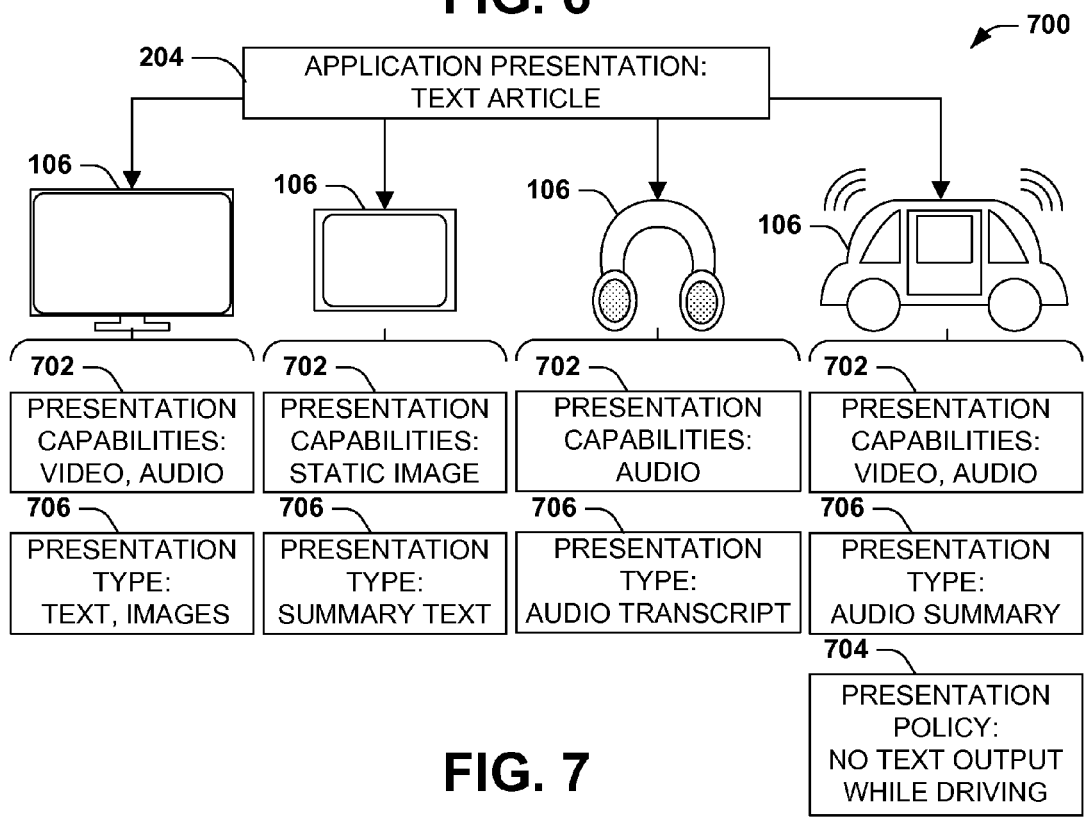
FIG. 7 is an illustration of an example scenario featuring a formatting of a presentation article on various presentation components according to presentation capabilities and presentation policies, in accordance with the techniques presented herein.

FIG. 7 presents an illustration of an example scenario 700 featuring several variations in the adjustment of an application presentation 204 to achieve an application presentation type 706. In this example scenario 700, the application presentation 204 involves a text article that the user 102 wishes to experience on one of several presentation components 106. Because each presentation component 106 exhibits different properties and/or a different context, the application presentation type 704 of the application presentation 204 may be selected in view of the selected presentation component 106. As a first such variation of this third aspect, the respective presentation components 106 may present the application presentation 204 according to a presentation capability. For example, presentation components 106 including a display may be determined to support video and/or static images, and presentation components 106 including a speaker may be determined to support audio. The device 104 therefore presents the application presentation 204 by selecting the application presentation type 702 for the application presentation 204 that utilizes the presentation capabilities 702 of the selected presentation component 106. For example, if a desktop display presentation component 106 is selected, the full text and images of the text article may be selected as the application presentation type 706; if a mobile device presentation component 106 featuring a small display and limited computational resources is selected, a summary of the text article may be selected as the application presentation type 706; and if a headphone presentation component 106 is selected, an audio transcript of the text article may be selected as the application presentation type 706.

The example scenario 700 of FIG. 7 also illustrates a second such variation of this third aspect, wherein the respective presentation components 106 are associated with a presentation component policy 704. For example, a vehicle presentation component 106 may feature presentation capabilities 702 including presenting audio and video, but may implement a presentation component policy 704 that restricts the display of text while the vehicle is moving. Accordingly, the device 104 may select an application presentation type 706 for the application presentation 204 that is consistent with the presentation component policy 704 of the selected presentation component 106 (e.g., presenting an audio-only summary of the text article).

As a third variation of this third aspect, the application history recorder may receives a request to relocate an application presentation 204 from a current presentation component 106 to the selected presentation component 106. The device 104 may, while relocating the application presentation 204, reformat the application presentation 204 from a current application presentation type 706 that is associated with the application presentation 204 through the current presentation component 106, to the application presentation type 706 of the selected presentation component 106. For example, upon receiving a request to move an application presentation 204 of an application 108 from a display presentation component 106 to an audio-only presentation component 106, the device 104 may reformat the application presentation 204 from a text-based application presentation type 706 to an audio-only application presentation type 706. Many such techniques may be utilized to adapt the application presentation 204 for a particular presentation component 106 in accordance with the techniques presented herein.

E4. Application Presentation State and Selection of Presentation Component

A fourth aspect that may vary among embodiments of the techniques presented herein involves the manner of selecting the presentation component 106 for the presentation of an application presentation 204 of an application 108.

As a first variation of this fourth aspect, the application presentation 204 on a particular presentation component 108 may exhibit persistence of particular presentation details from previous presentations of the same or similar application presentations 204. As a first such example, where the selected presentation component further comprises a display, the application presentation type 702 may further comprise a region of the display where the application presentation 204 has been previously presented. The device 104 may therefore presents the second application presentation 208 by positioning in the region of the display where the second application presentation 204 has been previously presented. As a second such example, where the previous application presentation 204 involved a particular application state, such as a position in a text, video, or audio recording that the user 102 has last consumed, the device 104 may resume the application presentation 204 using the last known application state.

Figure 8:
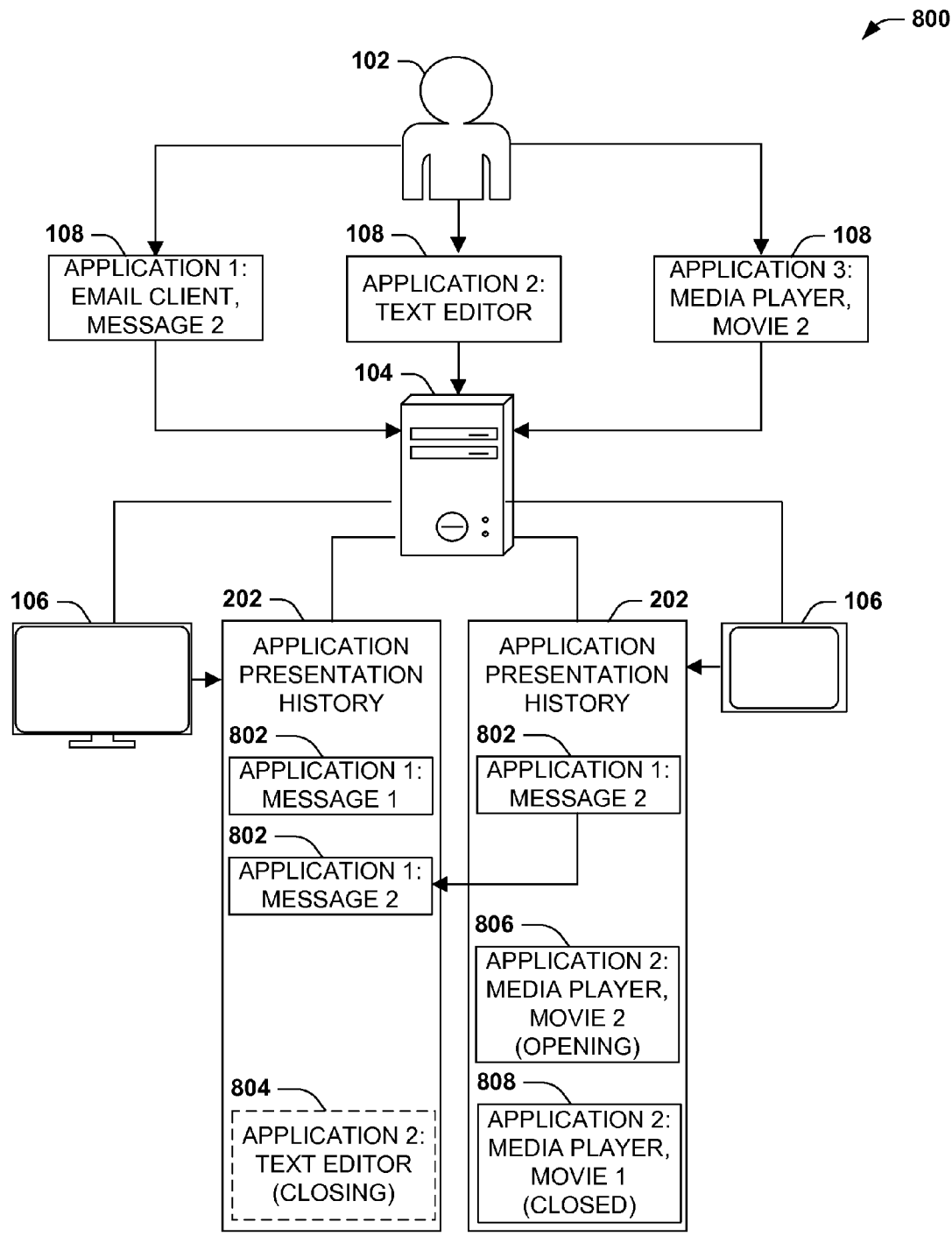
FIG. 8 is an illustration of an example scenario featuring the management of application presentations on presentation components of a device, in accordance with the techniques presented herein.

FIG. 8 presents an illustration of an example scenario 800 featuring several variations of this fourth aspect, wherein the application presentation histories 202 of various presentation components 106 are utilized to identify the selected presentation component 106 for the application presentations 204 of various applications 108. In this example scenario 800, a user 102 of a device 104 interacts with a variety of applications 108 having one or more application presentations 204, and in accordance with the techniques presented herein, the device 104 records such application presentations 204 in the application presentation histories 202 of the respective presentation components 106. Moreover, such recording may facilitate the selection of the presentation components 106 for further application presentations 204 of such applications 108.

As a second variation of this fourth aspect, FIG. 8 illustrates that a first application view 802 and a second application view 802 of the same application 108 may be concurrently presented on different presentation components 106. When the user 102 requests a transition of the first presentation component 106 to present second application view 802, the device 104 may move the second application presentation from the application presentation history 202 of the previous presentation component 106 to the application presentation history 202 of the selected presentation component 106. Such moving may facilitate the preservation of the presentation details and/or application state of the second application view 802, and/or the consolidation of the multiple application views 802 of the same or similar application 108 onto the same presentation component 106.

As a third variation of this fourth aspect, FIG. 8 illustrates that when the device 104 receives a request to suspend an application 108 having an application presentation 204 in the application presentation history 202 of a selected presentation component 106, the device 104 may remove the application presentation 204 of the application 108 from the application presentation history 204 of the selected presentation component 106. Alternatively, the device 104 may refrain from moving the application presentation 204 of the application 108 from the application presentation history 202, but may mark as inactive and/or de-prioritize the application presentation 204 in the application presentation history 202.

As a fourth variation of this fourth aspect, FIG. 8 illustrates that upon receiving request to transition to the second application presentation 208 of a selected application 108 after suspending the application 108, the device 104 may reinstantiate the application 108. As a particular example, where the request is received after suspending an earlier application presentation 204 of the second application 108 and does not specify the selected presentation component 106 where the second application presentation 208 of the reinstantiated application 108 is to be presented, the device 104 may identify the selected presentation component 106 on which the earlier application presentation 202 of the application 108 was presented.

Figure 9:
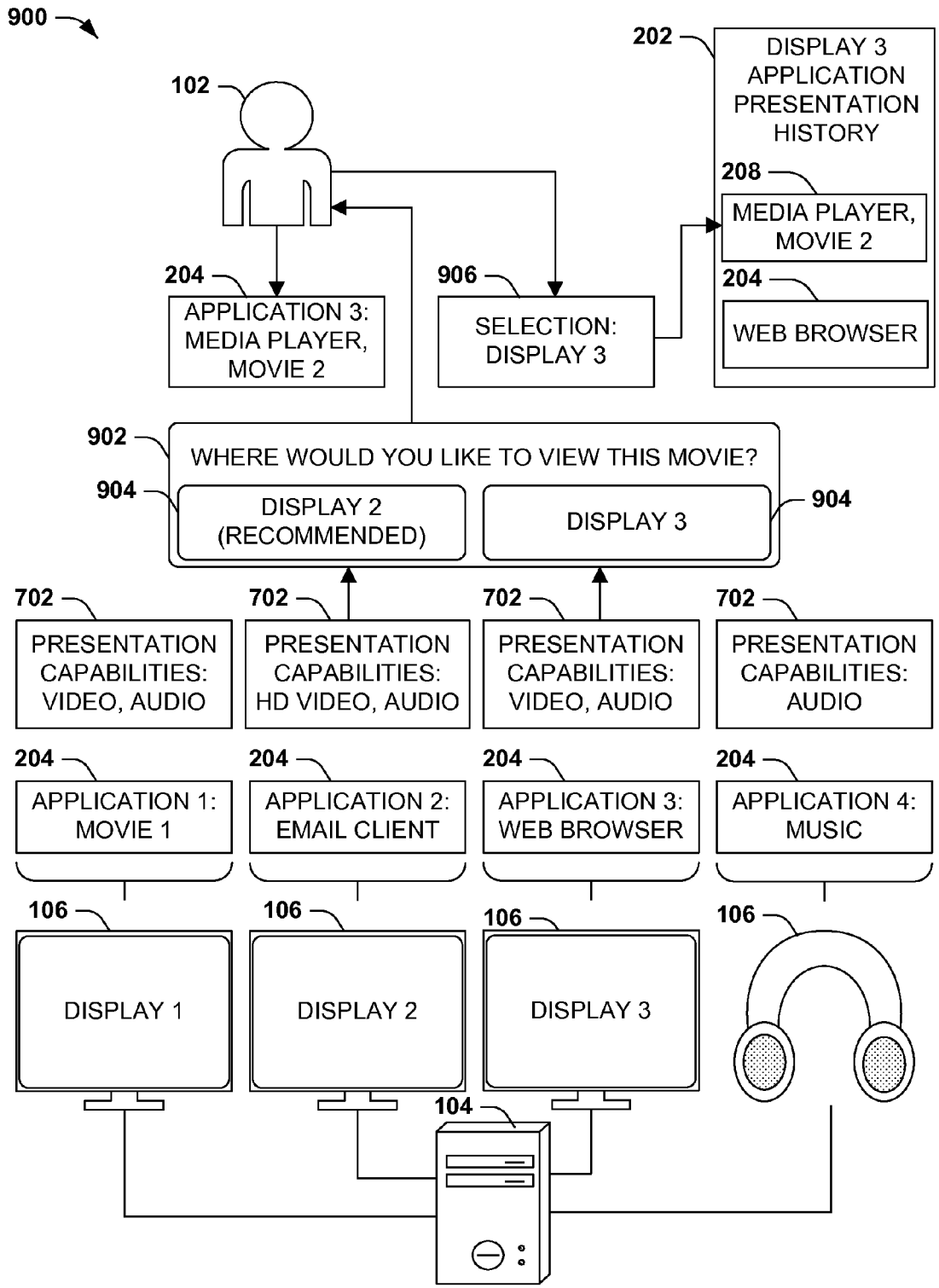
FIG. 9 is an illustration of an example scenario featuring a recommendation to a user for selecting a presentation component for an application presentation, in accordance with the techniques presented herein.

FIG. 9 presents an illustration of an exemplary scenario 900 featuring still further variations of this fourth aspect, involving the recommendation, among the presentation components 106 of the device 104, of a selected presentation component 106 for an application presentation 204 of an application 108. In this example scenario 900, the user 102 requests the device 104 to present an application presentation 204 of an application 108, such as a movie to be played through a video player, but does not specify which presentation component 106 is to be selected for the application presentation 204. The device 104 may perform a selection and/or recommendation based on an evaluation of the available presentation components 106. As a first such example, where the respective presentation components 106 present the application presentation 204 according to a presentation capability 702 (e.g., the capability of the respective presentation components 106 to present video and/or audio), the device 104 may identify the presentation components 106 that have the presentation capabilities 702 that are utilized by the application presentation 204 of the application 108 (e.g., ruling out a headphones presentation component 106 as incapable of playing video). As a second such example, the device 104 may evaluate the application presentation history 202 of each presentation component 106, and may therefore rule out presentation components 106 exhibiting an application presentation history 202 that is not suitable for the application presentation 204 (e.g., a display presentation component 106 may be excluded because it is currently displaying another movie). As a third such example, if multiple presentation components 106 are identified as suitable for the application presentation 204, the device 104 may comparatively evaluate such presentation components 106 (e.g., selecting a second display presentation component 106 that is capable of displaying high-definition video over a third display presentation component 106 that is not capable of displaying high-definition video). The device may automatically select and utilize the presentation component 106 identified by such comparative evaluation, and/or may present the results to the user 102 for selection (e.g., presenting to the user 102 a list 902 of options 904 for the at least two presentation components 106 that are suitable for the application presentation 204, optionally with a recommendation based on a comparative evaluation). Responsive to receiving from the user 102 a list selection 906 of an option 904 for a user-selected presentation component 106, the device 104 may select the user-selected presentation component 106 as the selected presentation component 106 for the second application presentation 204 of the second application 204. The device 104 may then record the application presentation 204 as the second application presentation 208 in the application presentation history 202 of the selected presentation component 106, and may transition the selected presentation component 106 to the second application presentation 208. In this manner, the device 104 may guide the user 104 in the selection of the presentation component 106 for the application presentation 204 in accordance with the techniques presented herein.

E5. Application Presentation History Flexibility and Adaptation

A fifth aspect that may vary among embodiments of the techniques presented herein involves circumstance when the device 104 may initiate or allow an adaptation of the application presentation histories 202 of the respective presentation components 106.

As a first variation of this fifth aspect, a user 102 may request to view, on a first presentation component 106, the application presentation history 202 for a second presentation component 106 (e.g., the list of application presentations 206 that have occurred on another monitor). Responsive to receiving a selection of an option from the list, the device 104 may either present the associated application presentation 206 on the second presentation component 106 (e.g., identifying the selected application presentation 206 as the current application presentation 206 for the second presentation component 106). Alternatively, the device 104 may move the selected application presentation 206 from the application presentation history 202 of the second presentation component 106 to the application presentation history 202 of the first presentation component 106 (e.g., moving an application 108 from the second monitor to the first monitor).

As a second variation of this fifth aspect, a first application presentation 204 may have a relationship with a second application presentation 204 of the same application 108 or a different application 108. For example, a first application 108 presented on a selected presentation component 106 may have been instantiated by a second application 108 that is also presented on the selected presentation component 106 (e.g., an email client that was instantiated when the user 102 selected a "mailto:" link within a web page presented by a web browser). The device 104 may store such relationships as part of the application presentations 204. Accordingly, if either application presentation 204 is relocated to a new presentation component 106, the related application presentation 204 may also be relocated to the new presentation component 106, thereby maintaining the logical connection and proximity of applications 108 that may be used together for a particular task.

As a third variation of this fifth aspect, the device 104 may initiate and/or allow a combined presentation of the application presentation histories 108 of the respective presentation components 106. As a first such example, the user 102 may wish to view the complete set of application presentation histories 202 on several or all of the presentation components 106 (e.g., the user 102 may be having difficulty finding an application 108 that is executing on the device 104, among a potentially large set of presentation components 106). The device 104 may therefore present a merged set of application presentation histories 202 of at least two presentation components 106, and may achieve such merged presentation in a variety of ways (e.g., grouped by presentation component 106 or presentation component type, grouped by application type, and/or sorted by chronology and/or alphabetic order of application names). As a second such example, the user 102 may wish to relocate some or all of the applications 108 from a first presentation component 106 to a second presentation component 106. The device 102 may therefore merge the application presentations 204 of the associated applications 108 from the application presentation history 202 of the first presentation component 206 to the application presentation history 202 of the second presentation component 206.

As a fourth variation of this fifth aspect, the device 104 may initiate and/or allow a splitting or distribution of an application presentation history 202 of a first presentation component 106 to one or more other presentation components 106. For example, the device 104 may detect, and/or the user 102 may indicate, that the first presentation component 106 is overloaded (e.g., the number of windows presented on a display may exceed a usable threshold). The device 104 may therefore split the application presentation history 202 of the first presentation component 106, and may redistribute various subsets of the application presentation history 202 to other presentation components 106. Such redistribution may involve, e.g., reviewing the history of respective application presentations 202, such as where the respective applications 108 have previously been presented.

As a fifth variation of this fifth aspect, when a new presentation component 106 is added to the set of presentation components 106 available to the device 104, the device 104 may generate a new application presentation history 202 for the new presentation component 106. Alternatively, if the new presentation component 106 has previously been connected to the device 104 and has now been reconnected following a disconnection period, the device 104 may load a previous application presentation history 202 for the new presentation component 106, and may reinstantiate applications 108 associated with such application presentation histories 202 that have been terminated in the interim (e.g., responsive to the disconnection of the new presentation component 106 from the device 104). Optionally, such applications 108 may be reinstantiated with a latest application state, which may have been persisted upon disconnection of the presentation component 106 and/or termination of the application 108.

As a sixth variation of this fifth aspect, the addition of a new presentation component 106 to the set of presentation components 106 available to the device 104 may prompt a reevaluation of the allocation of applications 108 to presentation components 106, and may relocate one or more applications 106 from a first presentation component 106 to the new presentation component 106. Such relocation may involve moving the application presentation 204 from the application presentation history 202 of the first presentation component 106 to the application presentation history 202 of the new presentation component 106. Such reevaluation may include a load-balancing consideration (e.g., moving application presentations 204 from a first presentation component 106 exhibiting a crowded application presentation history 202 to the new presentation component 106), and/or an evaluation of the appropriateness of each presentation component 204 for each application 108 (e.g., moving the application presentation 204 from a first presentation component 106 to the new presentation component 106 that is capable of rendering the application 108 at higher quality, such as a higher-resolution display or a higher-fidelity speaker set). The relocation may involve a review of the history of the application presentation 204; e.g., the application 108 may have previously presented on the new presentation component 106, and may be moved back to the new presentation component 106 following a period of disconnection. In one such embodiment, the determination of whether or not to perform such relocation may be based on the duration of the disconnection period; e.g., a brief disconnection period may prompt the device 108 to return the application 108 automatically, while a more extended disconnection period may enable the application 108 to remain on the substitute presentation component 106 unless the user 102 initiates a relocation. In another such embodiment, the determination of whether or not to perform such relocation may be based on the interaction of the user 102 with the application 108; e.g., if the user 102 has interacted with the application 108 on the substitute presentation component 106, then the application may remain, but if the user 102 has not interacted with the application 108 on the substitute presentation component 106, an automated relocation may be initiated.

As a seventh variation of this fifth aspect, when a presentation component 106 is disconnected from the device 104, the device 104 may respond in various ways. As a first such example, the device 104 may discard the application presentation history 202 for the disconnected presentation component 106, or may persist the application presentation history 202 in case of reconnection at a later time. As a second such example, the device 104 may relocate one or more applications 1098 that were presented on the disconnected presentation component 106 to other presentation components 106, e.g., by moving the application presentation 204 from the application presentation history 202 of the disconnected presentation component 106 to the application presentation history 202 of another presentation component 106. Alternatively, the device 104 may terminate the applications 108 that were presented only on the disconnected presentation component 106. Optionally, the device 104 may persist an application state of such applications 108, and may restore such applications 108 with the latest application state if the application 108 is reinstantiated on a reconnection of the same presentation component 108 or on a different presentation component 108. Many such variations may be included in the adaptation of the application presentation histories 202 to reflect the dynamic nature of the computing environment of the user 102 and the device 104 in accordance with the techniques presented herein.

F. Computing Environment

Figure 10:
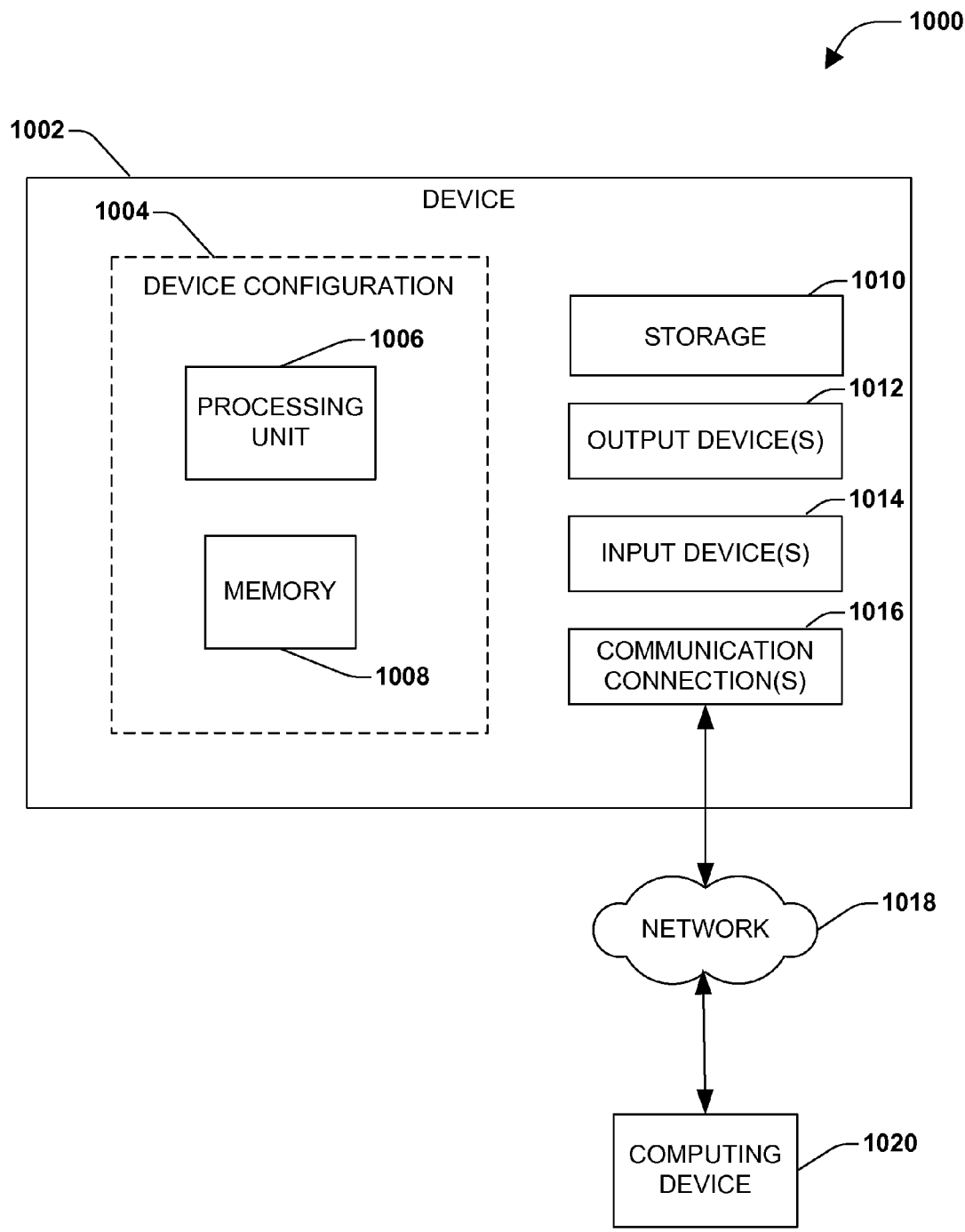
FIG. 10 is an illustration of an example computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1008 and storage 1010 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 920 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting applications on a device having a processor and at least two presentation components, the method comprising:
    executing on the processor instructions that cause the device to:
        for respective presentation components, generate an application presentation history identifying application presentations of applications through the presentation component;
        responsive to presenting an application presentation of a selected application through a selected presentation component, record the application presentation in the application presentation history of the selected presentation component; and
        responsive to receiving a request to transition a selected presentation component away a current application presentation:
            from the application presentation history of the selected presentation component, select a second application presentation; and
            transition the selected presentation component from the current application presentation to the second application presentation.

2. The method of claim 1, wherein:
    the application presentation history of the respective presentation components further represents an application order history in which the application presentations have been presented through the presentation component; and
    selecting the second application further comprises: selecting the second application presentation that precedes the current application presentation in the application order history of the application presentation history for the selected presentation component.

3. The method of claim 2, wherein the application order history further represents an order in which the applications have been selected by a user of the device.

4. The method of claim 2, wherein:
    the selected presentation component further comprises a display;
    the application order history is associated with a Z-order of application presentations that are presented on the display; and
    transitioning the selected presentation component further comprises: reordering the second application presentation above the current application presentation in the Z-order of the display.

5. The method of claim 1, wherein selecting the second application presentation further comprises:
    presenting to a user the applications having an application presentation in the application presentation history of the selected presentation component; and
    receiving from the user a selection of a second application that is associated with the second application presentation from the application presentations.

6. The method of claim 1, wherein:
    the current application presentation is associated with a task flow providing a task order; and
    selecting the second application further comprises: selecting the second application presentation that follows the current application presentation in the task order of the task flow.

7. The method of claim 1, wherein:
    the selected application further comprises at least two application views; and
    recording the application presentation further comprises: responsive to presenting a selected application view of the selected application through a selected presentation component, recording the application presentation of the selected application view of the selected application into the application presentation history of the selected presentation component.

8. A device that presents applications, comprising:
    at least two presentation components;
    a processor; and
    a memory storing instructions that, when executed on the processor, provide:
        for respective presentation components, an application presentation history that identifies application presentations of applications through the presentation component;
        an application history recorder that, responsive to presenting an application presentation of a selected application through a selected presentation component, records the application presentation in the application presentation history of the selected presentation component; and
        an application switcher that, responsive to receiving a request to transition a selected presentation component away a current application presentation:

from the application presentation history of the selected presentation component, selects a second application presentation; and transitions the selected presentation component from the current application presentation to the second application presentation.

9. The device of claim 8, wherein:

respective application presentations are associated with an application presentation type; and the application switcher transitions the selected presentation component by presenting the application presentation of the second application through the selected presentation component according to the application presentation type.

10. The device of claim 9, wherein:

the selected presentation component presents the application presentation according to a presentation capability; and the application switcher presents the second application presentation by selecting the application presentation type for the second application presentation that utilizes the presentation capability of the selected presentation component.

11. The device of claim 9, wherein:

the selected presentation component presents the applications according to a presentation component policy; and the application switcher presents the second application by selecting the application presentation type for the second application that is consistent with the presentation component policy of the selected presentation component.

12. The device of claim 9, wherein:

an application history recorder receives the request to relocate an application presentation from a current presentation component to the selected presentation component; and the application switcher presents the second application by reformatting the second application from a current application presentation type that is associated with the application presentation through the current presentation component to the application presentation type of the selected presentation component.

13. The device of claim 9, wherein:

the selected presentation component further comprises a display;

the application presentation type further comprises a region of the display where the application presentation has been previously presented; and the application switcher presents the second application by positioning the application presentation in the region of the display.

14. A hardware device that presents applications through at least two presentation components, the hardware device comprising:

a plurality of application presentation histories, wherein respective application presentation histories are specific to a selected presentation component, and identify application presentations of applications through the selected presentation component, wherein a first application presentation history for a first presentation component is distinct from a second application presentation history for a second presentation component;

and an application presenter that:

responsive to presenting an application presentation of a selected application through a selected presentation component, records the application presentation in the application presentation history of the selected presentation component; and responsive to receiving a request to transition a selected presentation component away a current application presentation:

from the application presentation history of the selected presentation component, selects a second application presentation; and transitions the selected presentation component from the current application presentation to the second application presentation.

15. The hardware device of claim 14, wherein: receiving the request further comprises: receiving a request to suspend the current application on the selected presentation component; and transitioning the selected presentation component further comprises: removing the current application presentation of the current application from the application presentation history of the selected presentation component.

16. The hardware device of claim 14, wherein: receiving the request further comprises: receiving a request to transition to the second application presentation after suspending the second application; and transitioning the selected presentation component further comprises: reinstantiating the second application.

17. The hardware device of claim 16, wherein: receiving the request further comprises: receiving a request to transition to the second application presentation after suspending an earlier application presentation of the second application, the request not specifying the selected presentation component; and executing the instructions further causes the computing device to, responsive to receiving the request, identify the selected presentation component on which the earlier application presentation of the second application was presented.

18. The hardware device of claim 14, wherein: the respective presentation components present the applications according to a presentation capability; receiving the request further comprises: receiving a request to instantiate the second application, the request not specifying the selected presentation component; and executing the instructions further causes the computing device to, responsive to receiving the request, identify the selected presentation component having a presentation capability that is utilized by the application presentation of the second application.

19. The hardware device of claim 18, wherein: receiving the request further comprises: receiving a request to instantiate the second application, the request not specifying the selected presentation component; and executing the instructions further causes the computing device to, responsive to receiving the request: present to a user a list of at least two presentation components having a presentation capability that is utilized by the application presentation of the second application; and responsive to receiving from the user a list selection of a user-selected presentation component, select the user-selected presentation component as the selected presentation component for the second application.

20. The hardware device of claim 14, wherein: before the transitioning, the second application presentation is presented through a previous presentation component; and transitioning the selected presentation component further comprises: moving the second application presentation from the application presentation history of the previous presentation component to the application presentation history of the selected presentation component.

* * * * *